United States Patent [19]
Nemser et al.

[11] Patent Number: 5,960,777
[45] Date of Patent: Oct. 5, 1999

[54] COMBUSTION ENGINE AIR SUPPLY SYSTEM

[75] Inventors: Stuart Marshall Nemser; Kevin Patrick Callaghan, both of Wilmington, Del.; Todd Colin Reppert, Elkton, Md.

[73] Assignee: Compact Membrane Systems, Inc., Wilmington, Del.

[21] Appl. No.: 09/027,035

[22] Filed: Feb. 20, 1998

[51] Int. Cl.$^6$ .................................................. F02B 23/00
[52] U.S. Cl. ............................................ 123/585; 123/26
[58] Field of Search ...................................... 123/585, 26

[56] References Cited

U.S. PATENT DOCUMENTS

| | | | |
|---|---|---|---|
| 4,230,463 | 10/1980 | Henis et al. | 55/15 |
| 4,840,819 | 6/1989 | Williams et al. | 427/245 |
| 4,844,871 | 7/1989 | Polaschegg | 422/81 |
| 5,051,113 | 9/1991 | Nemser | 55/16 |
| 5,051,114 | 9/1991 | Nemser et al. | 55/16 |
| 5,116,650 | 5/1992 | Bowser | 428/34.2 |
| 5,147,417 | 9/1992 | Nemser | 55/16 |
| 5,238,471 | 8/1993 | Blanchet-Fincher | 96/13 |
| 5,526,641 | 6/1996 | Sekar et al. | 60/274 |
| 5,554,414 | 9/1996 | Moya et al. | 427/244 |
| 5,636,619 | 6/1997 | Poola et al. | 123/585 |
| 5,649,517 | 7/1997 | Poola et al. | 123/585 |
| 5,678,526 | 10/1997 | Cullen et al. | 123/690 |

FOREIGN PATENT DOCUMENTS

| | | |
|---|---|---|
| 0 641 594 A1 | 3/1995 | European Pat. Off. . |
| 0 649 676 A1 | 4/1995 | European Pat. Off. . |
| WO 90/15562 | 12/1990 | WIPO . |

OTHER PUBLICATIONS

Designer's Corner, Hollow–fiber membrane, Design News, Dec. 15, 1997.

Nemser, Stuart, Applications of Membranes in Industry Glassy Fluoropolymer Membranes, 21st Aharon Katzir–Katchalsky Conference, Rehovot, Israel, Sep. 5–8, 1993.

Pinnau, I., et al., Gas and vapor transport properties of amorphous perfluorinated copolymer membranes based on 2,2–bisfluoromethyl–4,5–difluor–1,3–dioxole/tetrafluoroethylene, Journal of Membrane Science 109, 1996, pp. 125–133.

Nemser, S., Manos, P. McGettigan, K., Cragg, G., Callagan, K., and Himelreich, L., High Gas Flux Hollow Fiber Membranes, Chart Presentation to North American Membranes Society Annual Meeting, May 27, 1997.

Compact Membrane Systems, Inc.—DuPont Automotive Brochure, Society of Automotive Engineers Meeting, Feb. 27, 1997.

Compact Membrane Systems, Inc.—Summary of Test Results at CMS: NOx Reduction Using Nitrogen Enriched Air Via Membrane Modules & Power Enhancement Using Oxygen Enriched Air Via Membrane Modules, Dec., 1997.

Nemser, S., Compact Membrane Systems, Inc. Untitled Technical Report, Presented at Business Communications Conference, Boston, MA, Oct. 28, 1997, 21 pp.

Chart: Typical Effects of Oxygen Enrichment on Automotive Performance, Society of Automotive Engineers Annual Meeting, Detroit, Michigan, Feb. 26, 1996.

Compact Membrane Systems, Inc., *High Gas Flux Hollow Fiber Membranes*, Business Communications Corporation Conference, Newton, MA Oct. 29, 1996.

*Primary Examiner*—Noah P. Kamen
*Attorney, Agent, or Firm*—Jeffrey C. Lew

[57] ABSTRACT

A novel method of operating an internal combustion engine employs a selectively gas permeable membrane to provide either oxygen or nitrogen enriched air feed to beneficially affect engine performance. By feeding enriched air from a membrane unit such performance parameters as reduced NOx emissions, lean burn limit, engine power, and reduced cold start emissions can be enhanced relative to feeding ambient air. The selectively gas permeable membrane unit further includes a nonporous membrane (i) having an oxygen/nitrogen selectivity of at least 1.4 and a permeability to oxygen of at least 50 barrers; (ii) formed from an amorphous copolymer of perfluoro-2,2-dimethyl-1,3-dioxole; and (iii) being at a temperature below the glass transition temperature of the amorphous copolymer.

A cylindrical module having many substantially parallel aligned small diameter hollow fiber membrane structures is ideally suited for carrying out the novel method. The apparatus can be configured to furnish only one of permeate fraction, oxygen enriched air or retentate fraction, nitrogen enriched air. Additionally, the apparatus can be configured to switch between oxygen and nitrogen enrichment modes.

29 Claims, 8 Drawing Sheets

COMBUSTION ENGINE AIR SUPPLY SYSTEM

FIELD OF THE INVENTION

This invention relates to a system for controlling the composition of air feed to an internal combustion engine. More specifically, it relates to a system that employs a selectively gas permeable membrane to provide either oxygen or nitrogen enriched air feed to an internal combustion engine so as to beneficially affect engine performance.

BACKGROUND AND SUMMARY OF THE INVENTION

The use of internal combustion engines pervades modern industrial society. Exhaust emission quality and fuel consumption efficiency are important aspects of operating such engines. The exhaust gas can contain unreacted fuel and combustion reaction byproducts which are harmful to the natural environment generally and especially to human health. If the engines are operated inefficiently, not only is more unreacted fuel emitted, but the amount of fuel consumed per unit of power produced increased. Because most internal combustion engines use nonrenewable, fossil fuels, excessively poor fuel consumption efficiency is undesirable. The finite sources are consumed more quickly and the natural environment is adversely impacted by the need to extract the less accessible sources. Poor fuel consumption efficiency also raises the cost of operating an engine.

Atmospheric air nominally contains about 79 volume % nitrogen and about 21 volume % oxygen. (The presence of various minor fractional components in air such as argon, carbon dioxide, ozone, and other air pollutants is recognized but is not germane to the present invention.) Air supplied to internal combustion engines produces nitrogen oxides, sometimes referred to as "NOx". These are undesirable components of engine exhaust emissions. Within limits, increasing the concentration of nitrogen fed to the engine can reduce the amount of NOx emitted.

Theoretically, refined or manufactured nitrogen can be blended with ambient air to increase the nitrogen concentration in the engine feed. For mobile engines, such as automobile, marine and portable generator gasoline and diesel fueled engines, providing a mobile supply of nitrogen has not been possible. Even for stationary engine installations, this technique is generally not practical.

A method that has been applied with some success for boosting the concentration of nitrogen in engine air involves the recirculation of exhaust gas. The exhaust gas is largely depleted of oxygen which has been consumed during combustion with the fuel and is enriched in nitrogen. By blending the exhaust gas with fresh air, the overall concentration of nitrogen is raised. Unfortunately, exhaust gas contains additional contaminants. These include particulates, carbon dioxide, carbon monoxide, volatile organic components from unreacted fuel and, of course, NOx. Particulates can be filtered, but filtration adds to the complexity of operating an engine. The filter ultimately will become blinded and itself becomes a source of waste requiring disposal or cleaning. The gaseous contaminants cannot be deemed to have a beneficial effect on engine performance or maintenance. Furthermore, a portion of the power of the engine must be used to filter and recycle the exhaust gas. It is thus desirable to have a plentiful source of nitrogen enriched air to enhance the concentration of nitrogen in internal combustion engine feed to reduce the amount of NOx in the exhaust. It is even more desirable that the source of nitrogen be portable.

Accordingly, the present invention now provides a method of operating an internal combustion engine with a plentiful and portable source of nitrogen enriched air. The novel method comprises the steps of:

(A) separating air into an oxygen enriched fraction and nitrogen enriched fraction with a selectively gas permeable membrane unit; and (B) feeding the oxygen enriched fraction or the nitrogen enriched fraction to the engine;

wherein the selectively gas permeable membrane unit includes a nonporous membrane (i) having an oxygen/nitrogen selectivity of at least 1.4 and a permeability to oxygen of at least 50 barrers; (ii) formed from an amorphous copolymer of perfluoro-2,2-dimethyl-1,3-dioxole; and (iii) being at a temperature below the glass transition temperature of the amorphous copolymer.

Certain aspects of internal combustion engine operation can be improved by feeding oxygen enriched air to the combustion chambers. One of these is reduction of cold start emission. That is, an engine started from a cold condition tends to burn fuel more inefficiently than normal until it achieves steady state operating temperature. The unburned fuel is emitted with the exhaust gas and contaminates the environment. Cold start emissions can be a significant source of air pollution, especially from automobiles.

The lean burn limit can also be improved by increasing the oxygen content of engine air. Again within limits, the ratio of fuel to air can be adjusted to obtain better fuel consumption efficiency. The leaner the fuel/air mixture, the better the economy. The higher limit of air to fuel ratio, the so-called lean burn limit, can be extended by boosting the concentration of oxygen in the air.

Thus it is sometimes desirable to supply internal combustion engines with oxygen enriched air. Exhaust gas recirculation is not a viable method of accomplishing this aim. However, the present invention does provide a method of operating an internal combustion engine with a plentiful and portable source of oxygen enriched air. The novel method comprises the steps of:

(A) separating air into an oxygen enriched fraction and nitrogen enriched fraction with a selectively gas permeable membrane unit; and (B) feeding the oxygen enriched fraction to a combustion chamber of the engine; wherein the selectively gas permeable membrane unit includes a nonporous membrane (i) having an oxygen/nitrogen selectivity of at least 1.4 and a permeability to oxygen of at least 50 barrers; (ii) formed from an amorphous copolymer of perfluoro-2,2-dimethyl-1,3-dioxole; and (iii) being at a temperature below the glass transition temperature of the amorphous copolymer.

There is further provided according to the present invention an apparatus to feed enriched air to the combustion chamber of an internal combustion engine. The apparatus can be adapted to feed either nitrogen enriched air or oxygen enriched air. In one aspect the apparatus comprises:

(a) a selectively gas permeable membrane unit including
   a casing; and
   a nonporous membrane within the casing, wherein the membrane (i) has an oxygen/nitrogen selectivity of at least 1.4, and a permeability to oxygen of at least 50 barrers; (ii) is formed from an amorphous copolymer of perfluoro-2,2-dimethyl-1,3-dioxole; and (iii) is at a temperature below the glass transition temperature of the amorphous copolymer;
   a retentate cavity within the casing on one side of the membrane, the retentate cavity being a source of a retentate stream flow of nitrogen enriched air produced by selective permeation through the membrane of oxygen from a feed stream flow of ambient air into the retentate cavity; and a permeate cavity within the casing on the opposite side of the membrane, the permeate cavity being a source of a permeate stream flow of oxygen enriched air; wherein the ratio of the permeate stream flow to the feed stream flow defines a stage cut; and (b) pressure modification means for creating a negative pressure gradient across the membrane from a retentate cavity pressure to a permeate cavity pressure; and (c) a feed selection valve adapted to direct either oxygen enriched air or nitrogen enriched air to the combustion chamber.

The aforementioned apparatus can be adapted to provide a continuously optimum feed concentration of either oxygen or nitrogen enriched air by the incorporation of a feedback control system. The feed back control system basically includes sensing means for detecting operating characteristics at selected locations in the apparatus and for converting the detected characteristics to machine readable signals, throttle means for adjusting the stage cut, and control means for evaluating the signals in accordance with a preprogrammed algorithm. The control means thus issue commands to the throttle means so as to make adjustments to the stage cut calculated to obtain improved operating characteristics.

DETAILED DESCRIPTION

Figure 1:
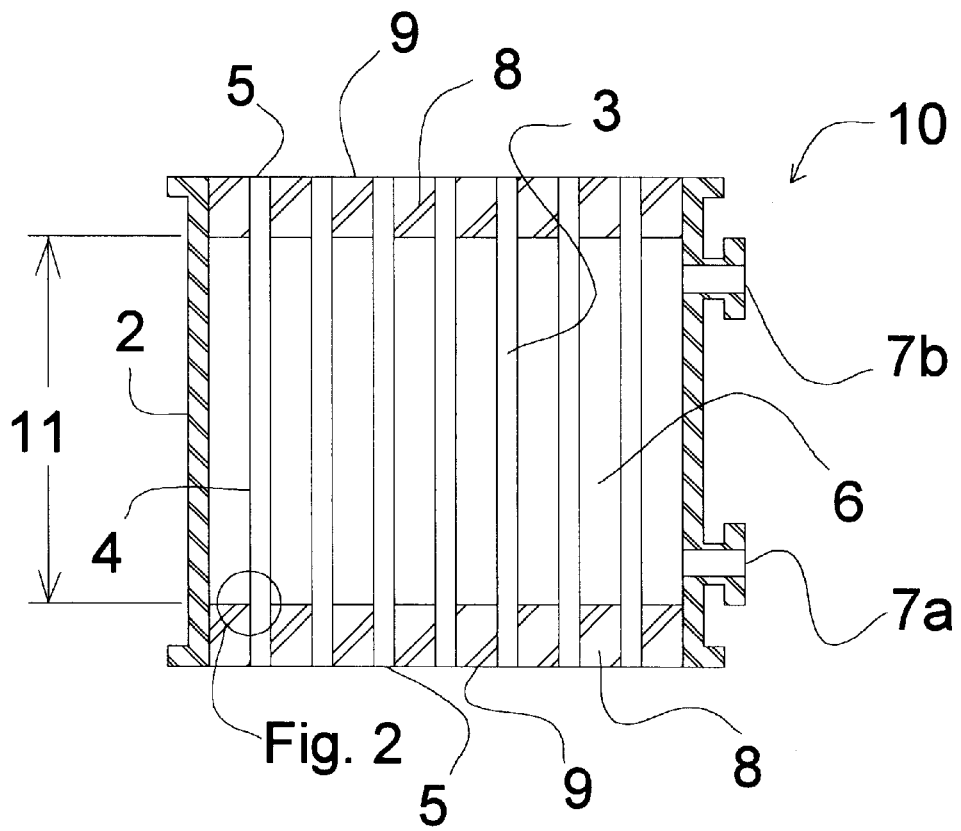
FIG. 1 is a section view of a compact hollow fiber gas permeable membrane unit according to the present invention.

The novel method for feeding either oxygen or nitrogen enriched air to the combustion chamber of an internal combustion engine involves in situ production of nitrogen enriched and oxygen enriched fractions from ambient atmospheric air. Once produced, the desired fraction can be directed into the combustion chamber. The unwanted fraction is safe to discharge to atmosphere.

As used herein, "internal combustion engine" means any type of spark induced ignition or compression induced ignition engine which requires a combustible mixture of oxygen and fuel to operate. The engine can be mobile or permanently fixed in a stationary location.

The novel method relies upon the ability of an oxygen-nitrogen selectively gas permeable membrane unit to separate ambient air to oxygen enriched and nitrogen enriched fractions. A preferred selectively gas permeable membrane unit includes a nonporous membrane with the following specific features. The membrane has an oxygen/nitrogen selectivity of at least about 1.4 and a permeability to oxygen of at least 50 barrers ($cm^3$ at standard temperature and pressure-$cm/cm^2$ $Hg \times 10^{-6}$). The membrane is formed from an amorphous copolymer of perfluoro-2,2-dimethyl-1,3-dioxole. The membrane operates at a temperature below the glass transition temperature of the amorphous copolymer.

The separation process of this invention basically is carried out by feeding ambient air into a unit containing the membrane structure. The unit basically comprises a casing defining an interior space divided into two portions sealed from each other by the membrane structure. The incoming ambient air is introduced into one portion, hereinafter referred to as the retentate cavity. Thus the ambient air is brought in contact with the membrane. A negative pressure gradient across the membrane is created which causes oxygen and nitrogen to permeate through the membrane and into the second portion, hereinafter referred to as the permeate cavity. By "negative pressure gradient" is meant that the pressure of the retentate cavity is higher than that of the permeate cavity.

The membrane unit can operate at positive or negative pressures provided that the permeate cavity pressure is below the pressure of the retentate cavity, and further provided that the pressures are high enough to supply enriched air to the engine and to vent excess air as will be described in greater detail, below. One of skill in the art will appreciate from this disclosure that a pressure gradient can exist at various locations within each of the retentate cavity and the permeate cavity. In such situation, the proviso that the permeate cavity pressure is below that of the retentate cavity means that the highest pressure in the permeate cavity should be below the lowest pressure in the retentate cavity. Preferably, the retentate cavity pressure should be substantially greater than the permeate cavity pressure.

In view that the membrane is selectively permeable for oxygen relative to nitrogen, it follows that the resulting atmosphere within the permeate cavity is enriched in oxygen. Furthermore, the oxygen having preferentially permeated the membrane, retentate cavity atmosphere is partially depleted of oxygen. Consequently, the retentate atmosphere is enriched in nitrogen. The ratio of the flow of oxygen enriched permeate cavity air divided by the flow of feed air is defined as the "stage cut".

Preferably, the gas permeable substance is an amorphous copolymer of a certain perfluorinated dioxole monomer, namely perfluoro-2,2-dimethyl-1,3-dioxole ("PDD"). In some preferred embodiments, the copolymer is copolymerized PDD and at least one monomer selected from the group consisting of tetrafluoroethylene ("TFE"), perfluoromethyl vinyl ether, vinylidene fluoride and chlorotrifluoroethylene. In other preferred embodiments, the copolymer is a dipolymer of PDD and a complementary amount of TFE, especially such a polymer containing 50–95 mole % of PDD. Examples of dipolymers are described in further detail in U.S. Pat. Nos. 4,754,009 of E. N. Squire, which issued on Jun. 28, 1988; and 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all of these U.S. patents are hereby incorporated herein by reference.

The amorphous copolymer can be characterized by its glass transition temperature ("$T_g$"). The polymer property of glass transition temperature is well understood in the art. It is the temperature at which the copolymer changes from a brittle, vitreous or glassy state to a rubbery or plastic state. The glass transition temperature of the amorphous copolymer will depend on the composition of the specific copolymer of the membrane, especially the amount of TFE or other comonomer that may be present. Examples of $T_g$ are shown in FIG. 1 of the aforementioned U.S. Pat. No. 4,754,009 of E. N. Squire as ranging from about 260° C. for dipolymers with 15% tetrafluoroethylene comonomer down to less than 100° C. for the dipolymers containing at least 60 mole % tetrafluoroethylene. Preferably, the glass transition temperature of the amorphous copolymer should be at least 115° C.

The amorphous copolymer is further characterized by substantial hydrophobicity and oleophobicity. This incompatibility of the PDD copolymer with both water and oil also makes the gas permeable membrane not more than negligibly soluble or swellable in a wide range of liquids. This characteristic assures the preservation of the structural integrity and dimensional stability of the membrane while in contact with many liquid compositions, especially hydrocarbon fuels and oily lubricants commonly employed in connection with operating and servicing internal combustion engines.

The shape of the membrane structure of the present invention can be a flat sheet or other geometric configuration. A flat sheet can comprise one or more monolithic films of the nonporous, gas permeable substance. Gas flux through a permeable membrane is inversely proportional to the thickness and directly proportional to the gas transport area of the membrane. One of skill in the art will readily appreciate that to obtain a practically acceptable gas flux through a gas permeable film of reasonable surface area, a very thin film should be used. This is true even though the permeability of air through the amorphous copolymer preferred for use in this invention is quite high. The preferred nonporous film thickness for desirable gas flux is about 0.01 to about 25 μm.

Polymer film of less than about 12 μm generally is nonself supporting. Thus, in a preferred embodiment, the gas permeable membrane structure of this invention comprises an amorphous copolymer present as a nonporous layer on a microporous substrate. The substrate maintains structural integrity of the nonporous layer in service. The structure of the substrate should be designed to have porosity so as not to excessively impede the flow of the gaseous component. Representative porous substrates include a perforated sheet; a porous mesh fabric; a monolithic microporous polymer film; a microporous, hollow fiber and a combination of them.

The nonporous layer is located adjacent or directly on the microporous substrate and may be manufactured by any of a variety of methods known to those skilled in the art, including coating techniques such as dipping, spraying, painting and screeding. Preferably, the nonporous layer will be applied by a solvent coating method, and more preferably, by a novel solvent coating method suitable for placing an ultra thin, continuous, nonporous amorphous copolymer layer onto a microporous substrate. The novel method is disclosed in copending U.S. patent application Ser. No. 08/862,944 filed May 30, 1997, which is incorporated herein by reference. In context of thickness of the nonporous layer, the term "ultra thin" means about 0.01 to about 10 μm. Preferably, the ultra thin layer can be about 0.01–1 μm thick.

The membrane structure can also have a tubular configuration. A hollow fiber is a particularly preferred form of substrate for use in the present invention. The term "hollow fiber" refers to high aspect ratio bodies with extremely small cross section dimensions. By "high aspect ratio" is meant the ratio of the fiber length to fiber cross section dimension. Although other hollow shapes are possible and are contemplated to fall within the breadth of the present invention, cylindrical hollow fibers are preferred. The fiber outer and inner diameter generally is about 0.1–1 mm and about 0.05–0.8 mm, respectively.

The term "air transport area" means the effective area available for gas transport. Generally, the air transport area is the gas transport area of the membrane measured normal to the direction of gas flow. For example, the air transport area of a rectangular flat sheet membrane is the product of sheet length and width. Similarly, the air transport area of a single, cylindrical hollow fiber is the product of the fiber length and the circumference of the cylinder.

The preference for hollow fiber substrate derives from the ability to create a very large air transport area in a small volume, and especially, in a volume of small overall cross sectional area. The air transport area of a hollow fiber per unit of fiber volume increases inversely with the diameter of the fiber. Thus, surface area density of individual small diameter hollow fibers is very great. Additionally, a large number of fibers can be bundled substantially parallel to the axis of fiber elongation and manifolded. This effectively pools the air transport area to the total of the bundled individual fiber air transport areas. Due to the fiber geometry, a total effective air transport area of a hollow fiber bundle can be many multiples of the overall cross sectional area of the gas filter unit. For example, cylindrical hollow fiber membrane unit that is only 10 inches long and 3 inches in diameter can contain 6200 hollow fibers of 500 μm inner diameter and active length of 7.5 inches to provide as much as 18 ft$^2$ of air transport area.

Figure 2:
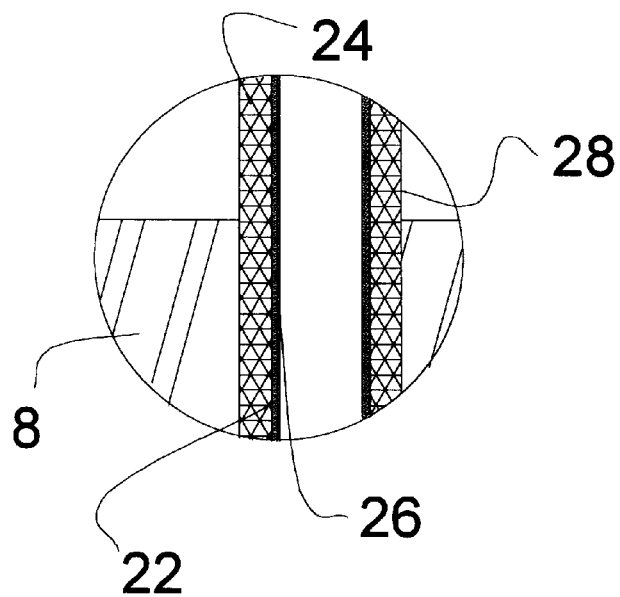
FIG. 2. is a detail view of a portion of the membrane unit of FIG. 1.

The structure of a hollow fiber membrane unit is illustrated in FIGS. 1 and 2. The membrane unit 10 has a generally elongated cylindrical casing 2 housing a plurality of hollow fibers 4. The fibers are held in place by tube sheets 8. The fibers extend through the tube sheets allowing open ends 5 to emerge on the outboard faces 9 of the tube sheets. The effective air transport area of each fiber is defined by the fiber diameter and by the length 11 between tube sheets.

Figure 3:
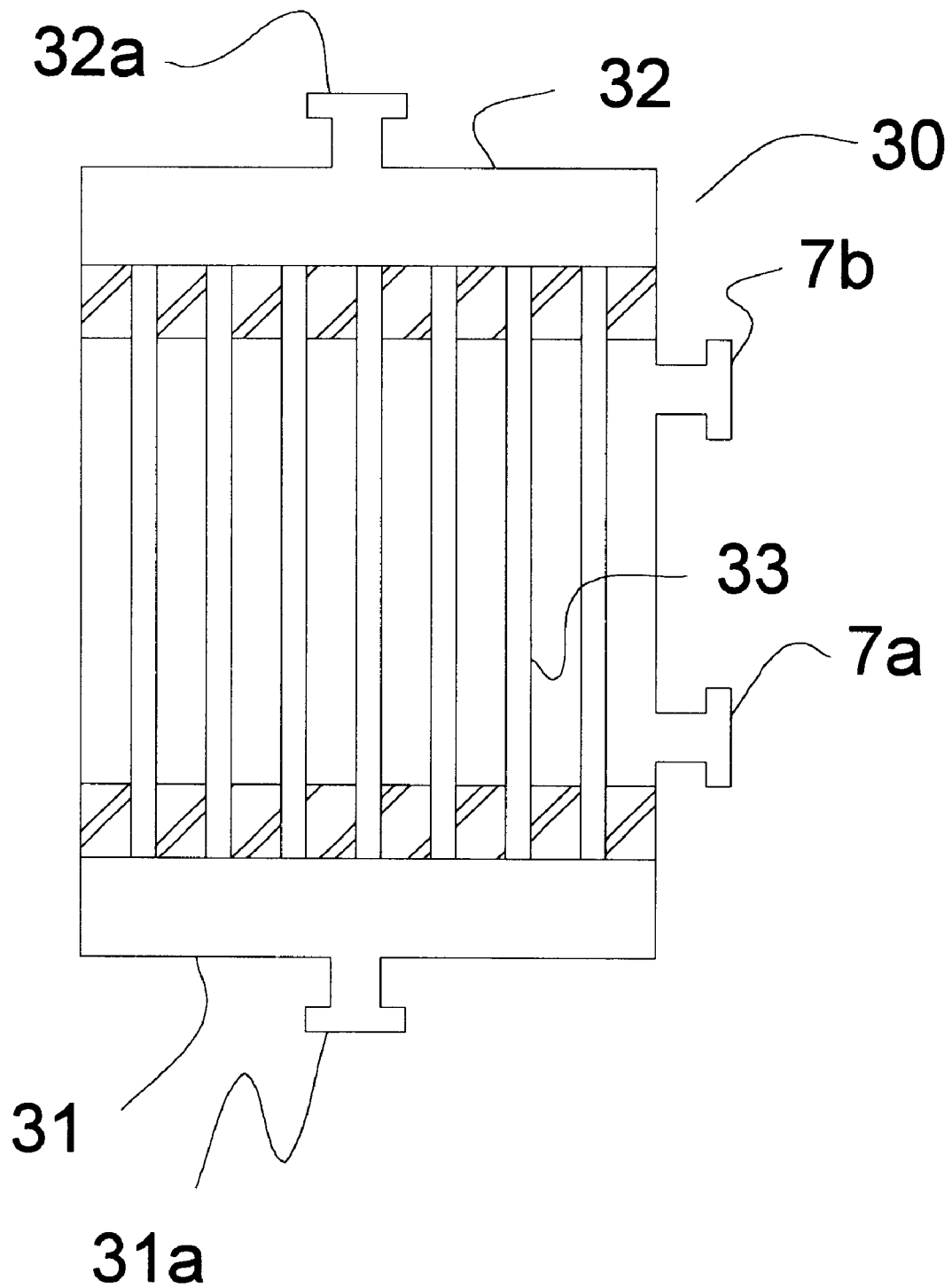
FIG. 3 is a section view of a cylindrical hollow fiber membrane unit with end caps in place.

FIG. 1 shows the fibers as being perfectly parallel. This is an ideal condition which need not, and usually, is not satisfied in practice. Owing to the extremely high length-to-diameter aspect ratio and the polymeric composition, each fiber is quite flexible. It is acceptable that the fibers are aligned substantially parallel, provided that space between neighboring fibers is effective to permit air contact with a major fraction of the outer surface of all fibers. The interior of the casing, the outside of the fibers and the inboard surfaces of the tube sheets define the shell side cavity 6. At least one port 7a, 7b through the casing is provided to allow flow into or out of the shell side cavity. The membrane unit module is installed in a gas filter with covers (31, 32 in FIG. 3) attached over the outboard faces of the tube sheets. The covers define inlet and outlet chambers which serve to conduct fluid into and out of the tubes. The space inside hollow fibers and within the inlet and outlet chambers, where applicable, is referred to as the tube side cavity. In the illustrated embodiment, FIG. 2, the interior gas filter surface 22 of the each fiber 24 is coated with a layer 26 of gas permeable polymer. In a contemplated alternative embodiment not shown the gas permeable layer can be coated onto the exterior surface 28 of the fiber. FIG. 2 shows that the fiber is firmly embedded into the tube sheet which provides a fluid tight seal between the shell side cavity and the tube side cavity.

Hollow fiber modules can be fabricated from fibers of various materials. Hollow fibers are available from Spectrum, Inc., Laguna Hills, Calif., and Hoechst Celanese Company, for example. A preferred method for mounting the fibers in tube sheets involves aligning a bundle of fibers and fixing the bundle together as a unit in a deep bed of thermoplastic or thermosetting cured polymer such as polyurethane. Another bed of cured polymer is used to secure the bundle at a distance (11 in FIG. 1) along the fibers from the first. A flat tube sheet outboard face can be made by cutting through one fixed bundle in a direction perpendicular to the axes of the fibers. At a convenient distance from the first outboard face, a cut through the other fixed bundle can be made to create the second outboard face. Finally, the tube bundle with tube sheets can be glued or otherwise sealed to the ends of an elongated casing to form the module. The method of making modules suitable for use in the present invention containing bare hollow fibers, i.e., fibers without a nonporous ultra thin gas permeable layer, is known to those of skill in the art. Modules containing multiple uncoated hollow fibers are commercially available from such manufacturers as Spectrum, Inc. and Hoechst Celanese.

Hollow fiber substrate also is preferred because the air transport area very effectively contacts the feed-retentate air. That is, incoming air flow can be directed through bundled hollow fibers in the fiber axial direction in a way that the air sweeps across all of the available gas filter area. In contrast, a gas permeable membrane based upon flat sheet geometry can have poorly purged "dead spaces" of retentate and permeate enriched air in stagnant contact with the elements. This causes a reduced rate of transfer through the membrane unit.

The feature that the membrane unit can have extensive air transport area while occupying a small volume is particularly advantageous for use with mobile engines, such as automobile engines. That is, the membrane unit can be conveniently located in the engine compartment where free space for modern engines and accessories is becoming ever more limited. Moreover, a hollow fiber membrane unit can be installed in an "inline" configuration. This means that the cylindrical body of the membrane unit can be mounted as a spool piece in the air intake pipe of an engine. Another advantage of such an installation is that an inline membrane unit can be relatively easily retrofitted to existing engines, thereby providing the benefits of burning enriched air to older engines.

Supplementing the ability provide a very large air transport area in a compact volume, the preferred amorphous copolymer used in the present invention also has very high oxygen permeability. For example, PDD/TFE copolymer membranes can exhibit a permeability for oxygen preferably of at least 100 barrers, more preferably of at least 200 barrers and most preferably of at least 500 barrers. Moreover, the high permeability of the amorphous copolymer of this invention coupled with the ability to provide the copolymer in an ultra thin nonporous layer on microporous substrates, especially hollow fibers provides excellent oxygen flux through the membrane unit. Oxygen flux in excess of about 400 GPU ($cm^3$ at standard temperature and pressure/$cm^2$-s-cm Hg$\times 10^{-6}$), and preferably above about 600 GPU can be achieved in accordance with this invention. Typically, the oxygen flux is in the range of 400–1500 GPU. Hence, the membrane unit is remarkably well suited to feeding internal combustion engines which generally demand high rates of air intake flow.

It is important that air is supplied to the engine not only at high flow rate but also in an enriched state. The membrane used in this invention exhibits very high oxygen/nitrogen selectivity. Oxygen/nitrogen selectivity should be at least about 1.4, preferably at least about 1.5, more preferably at least about 1.7. To achieve the minimum selectivity, it is important that the membrane of amorphous copolymer be nonporous and continuous over the entire air transport area. That is, the nonporous layer is coextensive with the substrate and uninterrupted, being substantially free of voids, perforations or other channels which could provide open passageways through the membrane for gaseous communication between the permeate cavity and the retentate cavity. Consequently, it is seen that the present invention provides a gas permeable membrane unit with a superior combination of high oxygen flux and high selectivity.

Further disclosure of the preferred selectively gas permeable membrane for use in this invention is made in U.S. Pat. No. 5,051,114, the entirety of which is hereby incorporated by reference.

Figure 4:
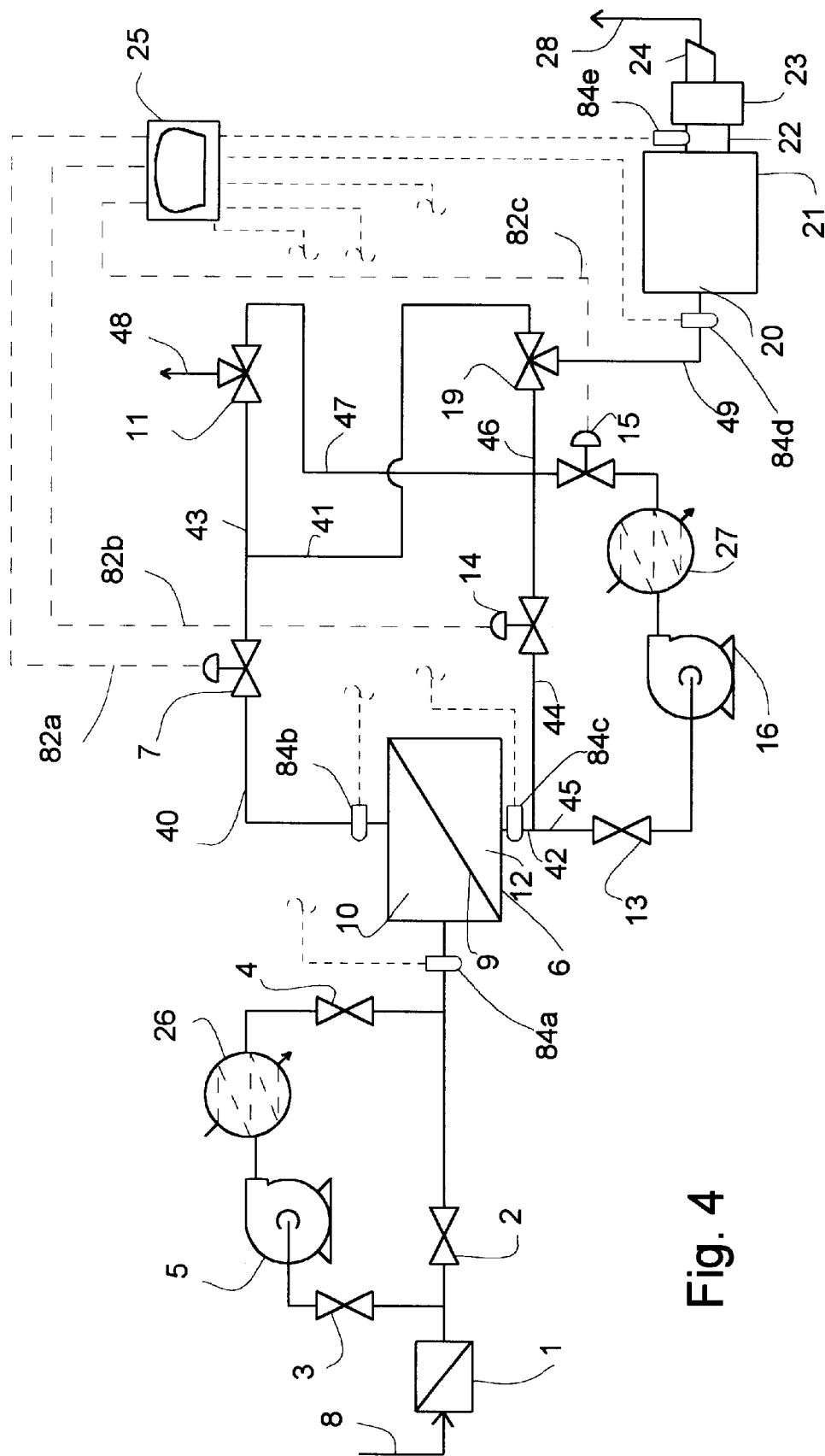
FIG. 4 is a schematic diagram of the apparatus according to the present invention.

The novel method can be understood with reference to FIG. 4, which schematically illustrates an apparatus suitable for implementation thereof FIG. 4 shows the enriched air feed and control system for an internal combustion engine 21. Other systems, such as fuel feed, carburation, electrical and engine cooling systems are conventional and are not shown.

Ambient atmospheric air 8 having nominal 79 vol. % nitrogen, 21 vol. % oxygen is admitted through a conventional air filter 1. Incoming air can be introduced directly into membrane unit 6 via transfer line through block valve 2 or it can be diverted to the pressure building unit via transfer line through block valve 3. The incoming air is brought into contact with membrane structure 9. A portion of the air permeates the membrane structure and thereby enters permeate cavity 12. Due to the selective permeability of the membrane structure, the permeate stream is enriched in oxygen. The partially oxygen depleted retentate stream discharges from retentate cavity 10 through transfer line 40 to retentate flow control valve 7. Permeate stream 42 flows either via transfer line 44 through flow control valve 14 or into the vacuum drawing unit via line 45 through block valve 13. Lines 40 and 44 as well as other transfer lines can also have in line block valves, not shown, for providing secure flow shut off capability or, as a matter of convenience, for isolating individual system elements. The retentate stream from flow control valve 7 is directed to inlet ports of three way vent valve 11 by line 43 and three way feed valve 19 by line 41. Similarly, the permeate stream from either flow control valve 14 or the vacuum drawing unit through flow control valve 15 is directed to separate inlet ports of three way valves 11 and 19, by lines 47 and 46, respectively. The common outlet port of three way vent valve 11 discharges excess enriched air 48, for example, by emission to the atmosphere. The common discharge port of three way feed valve 19 diverts enriched air through engine feed line 49 ultimately into the combustion cylinder 20 of engine 21. As mentioned, the enriched air fed to the engine can be mixed with fuel in a conventional carburation system, not shown, prior to entering the engine proper. Fuel and air combustion product 28 discharges from the engine through exhaust pipe 22 into a conventional post treatment unit 23, such as a catalytic converter, and emits to atmosphere through tail pipe 24.

Normally, only one of the retentate stream 40 and permeate stream 44 is fed to the engine through line 49 at a particular time. That is, three way feed valve 19 usually is set to pass flow from either 41 or 46 and to block flow of the other. The stream not consumed by the engine for combustion is vented through line 48. Accordingly, three way vent valve 11 should be set to pass either the permeate stream 47 or the retentate stream 43 and block the other. Stated differently, when permeate is fed retentate is vented, and when retentate is fed permeate is vented. Valves 11 and 19 can be operated independently, as indicated. For convenience of switching between permeate feed and retentate feed modes of operation, valves 11 and 19 can be linked mechanically so that a single operation changes the flow path through both simultaneously.

The process calls for imposing a negative pressure gradient across the membrane structure 9 from retentate cavity to permeate cavity. In a "pressure mode" of operation, the pressure of the retentate cavity is raised by compressing the incoming ambient air through a compressor 5. This is accomplished by closing block valve 2 and opening 3 and 4. Heat exchanger 26 is provided to cool the compressed air.

Compressor 5 and heat exchanger 26 are of conventional design. Pressure of air feeding the membrane unit should be high enough to overcome the pressure drop imposed by the flow restrictions in the system leading either to vent or to the engine. This includes the pressure drop imposed by the negative pressure gradient to induce selective permeation through the membrane structure. The pressure gradient across the membrane unit depends upon the volume of enriched air needed by the engine, and the size, i.e., air transport area of the membrane unit. Typically, the pressure gradient should be about 15 to about 75 psi, preferably about 20 to about 50 psi, and more preferably about 30 to about 45 psi. Preferably, the pressure at the discharge of compressor 5 should be at least about 30 psia in pressure mode operation. If a turbocharger turbine exists in the engine air supply system, it can be used for compression of the incoming atmospheric air. Traditionally, turbochargers are driven by engine exhaust gas. The compressor can also be driven by belts or mechanical linkage from the engine or by electricity. The compressed air can be cooled by air cooling or by heat exchange with an internal or external fluid coolant. By internal coolant is meant a recirculating cooling fluid, as is typically found in automobile engine cooling systems. External cooling refers to once-through cooling as is customary for cooling marine engines. The cooling system can include additional conventional coolant circulation pumps, valves and controls which are not shown or described herein.

The process can also be operated in a "vacuum mode" wherein the driving force for permeation is provided by a vacuum system on the permeate side of the membrane unit. In such operation, flow control valve 14 is closed and permeate enriched air flows through open valve 13 in line 45 into vacuum pump 16 and heat exchanger 27. Normal engine operating vacuum generally is not sufficient to produce the desired negative pressure gradient for permeation in vacuum mode without a vacuum pump. Consequently, a vacuum pump which is not usually found in conventional engine air intake systems is called for in vacuum mode operation. The vacuum pump can be of conventional technology, however. Preferably, the vacuum pump is driven electrically or mechanically, for example by linkage to the engine. The heat exchanger can be of conventional design as described above. It is noteworthy, however, that under certain engine operating conditions, for example, at low revolution per minute idle speed or at low power-high revolution per minute speed (e.g., automobile highway cruising condition) engine vacuum can be effective to motivate permeation without the need to operate an auxiliary permeate stream vacuum pump.

It is possible to operate the novel process simultaneously in compression and vacuum modes, that is with both compressor 5 and vacuum pump 16 present and functioning. However, compressors and vacuum pumps generally consume a significant amount of energy, and therefore, it is preferred to operate in a single mode at a time. More specifically, for a compression mode system, the vacuum pump and its associated heat exchanger can be eliminated from the apparatus. In vacuum mode, compressor 5 and heat exchanger 26 are not required to provide a very high membrane unit air feed pressure. Still, a slight positive pressure at the inlet of the membrane unit is called for to overcome incidental pressure drop of restrictions throughout the system. Consequently, in vacuum mode, a low pressure fan can be used in place of compressor 5 and heat exchanger 26 can be eliminated.

When the process is operated only in one of compression mode and vacuum mode, the energy consumed by the process of feeding enriched air to the engine can be kept very low. This makes the process extremely energy efficient. For example, it is possible to obtain substantially reduced NOx emissions as a result of feeding nitrogen enriched air with less than 5% loss of power.

The process of feeding enriched air to the engine can be used to obtain a variety of enhanced engine performance parameters. These include (i) reduced concentration of nitrogen oxides in engine exhaust, (ii) increased engine power, (iii) extended engine lean burn limit, and (iv) reduced cold start up emissions. Reduced NOx emissions can result from feeding nitrogen enriched air to the engine. As mentioned, this is achieved by venting the oxygen enriched permeate stream through line 47 to three way vent valve 11 while directing the nitrogen enriched retentate stream through line 41 to the engine via three way feed valve 19.

To achieve reduced cold start emissions, improved lean burn limit and higher engine power, air to the engine should be oxygen enriched. The apparatus can be easily converted to feeding oxygen enriched air by merely changing valve positions. Specifically, three way valves 11 and 19 should be changed so that the retentate stream is vented and the permeate stream is fed forward.

In certain utilities it may be desirable to provide an apparatus configured only for retentate stream feed or permeate stream feed with venting of the other stream. In such a system, three way valves 11 and 19 can be replaced with simple block valves and cross over transfer lines 41 and 46 can be eliminated.

Figure 5:
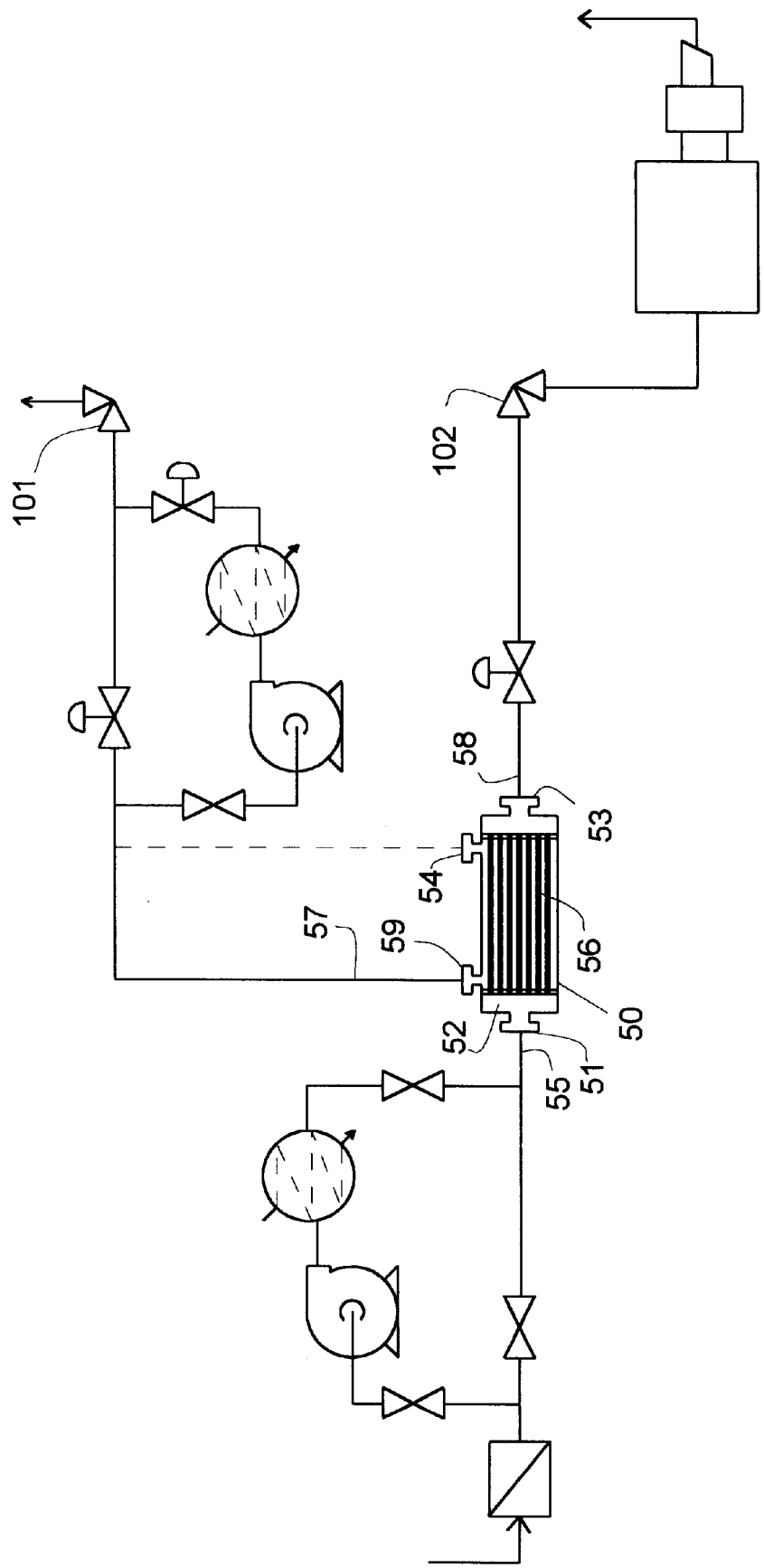
FIG. 5 is a schematic diagram of the novel apparatus configured only for feeding nitrogen enriched air to an engine.

FIG. 5 shows a retentate stream feed system which is suitable for obtaining improved NOx emissions from an internal combustion engine. In the illustrated embodiment, the gas permeable membrane unit 50 is a cylindrical, hollow fiber module. Ambient air stream 55 enters retentate cavity 52 through tube side port 51 and passes through the inside of tubes 56. Nitrogen enriched retentate stream 58 is withdrawn from tube side port 53. It is directed toward the engine through valve 102. Oxygen enriched permeate stream 57 is withdrawn from shell side port 59 to vent valve 101. Second shell side port 54 can be blanked closed as shown, or optionally, it can be connected to permeate stream 57 (in manner illustrated by the dashed line). Although shown as having right angles, valves 101 and 102 can be simple, straight block valves.

Figure 6:
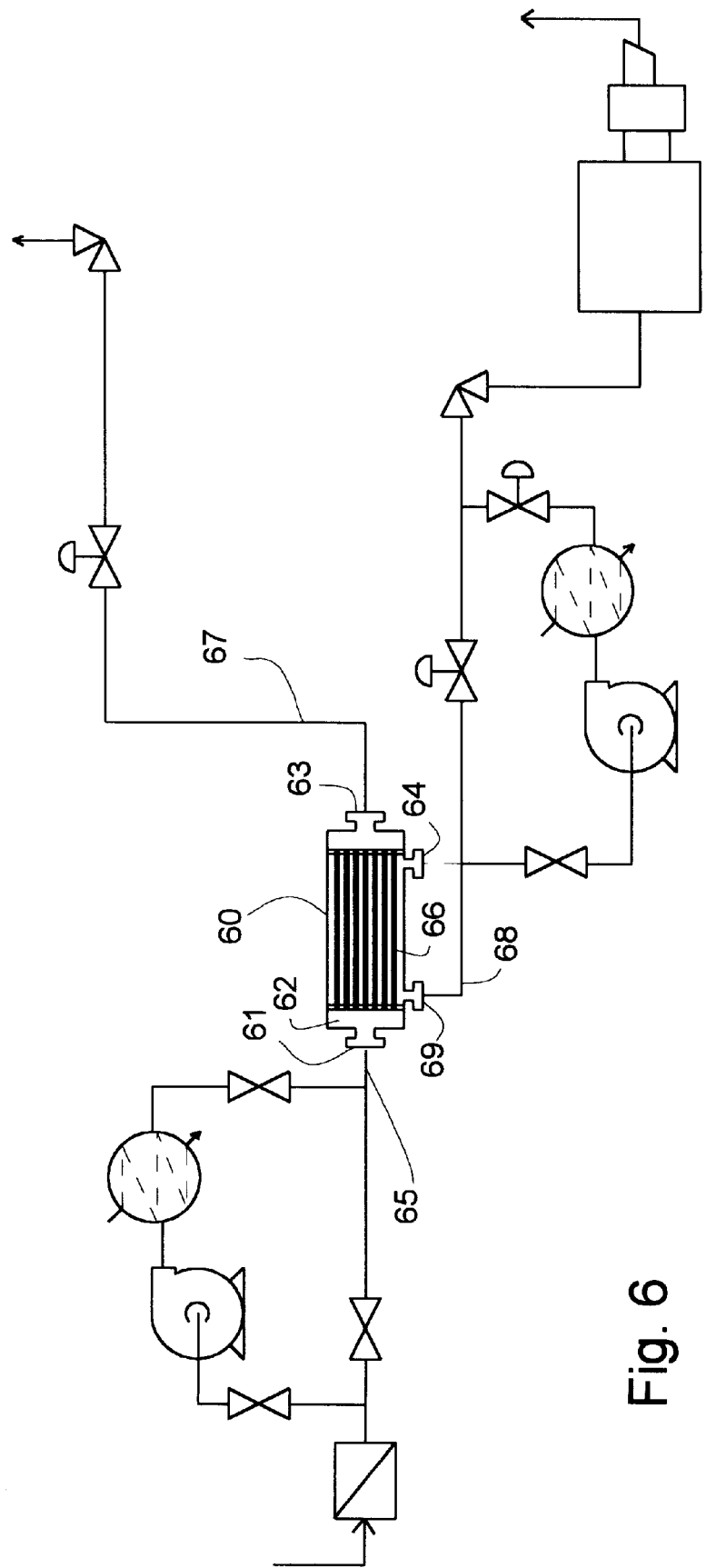
FIG. 6 is a schematic diagram of the novel apparatus configured only for feeding oxygen enriched air to an engine.

FIG. 6 shows a permeate stream feed system suitable for improved cold start emissions, lean burn limit or increased power. The membrane unit is a cylindrical, hollow fiber module 60 Ambient air stream 65 enters retentate cavity 62 through tube side port 61 and passes through the inside of tubes 66. Nitrogen enriched retentate stream 67 is withdrawn from tube side port 63. Oxygen enriched permeate stream 68 is withdrawn from shell side port 69 for feed to the engine. Second shell side port 64 can be blanked closed as shown, or optionally, it can be connected to permeate stream 68 (as illustrated in dashed line).

In one aspect, the novel method is adapted to configuration for feedback control (FIG. 4) so as to provide the correct concentration of nitrogen or oxygen enriched air to obtain optimum engine performance parameters. The feedback control system firstly includes throttling means 82a, 82b, and 82c, for independently adjusting the permeate stream flow rate and the retentate stream flow rate. Such throttling means can include conventional pneumatically operated control valves, represented schematically in the figures. The feedback control system secondly includes sensing means 84a, 84b, 84c, 84d and 84e, for detecting and converting apparatus operating characteristics at selected locations in the apparatus and engine performance parameters to machine readable signals. Thirdly, the feedback control system includes programmable control means 25 for receiving the machine readable signals, evaluating the signals according to a preselected programmed algorithm, and dispatching control signals to the throttling means. The programmable control means can be a computer system, preferably having a digital electronic central processor unit and analog to digital conversion devices effective to convert analog signals generated by sensing means 84a–84e to digital form for processing, and for converting digital processor output to analog control signals for use by throttling means 82a–82c.

Parameters sensed by control system include the flow rate, temperature, pressure, oxygen and nitrogen concentrations of the membrane unit feed stream 84a, the retentate stream 84b and the permeate stream 84c, temperature, pressure, flow rate, concentration of enriched air stream fed to the engine, ratio of air to fuel, and engine power output 84d, and pressure, temperature, flow rate and concentration of the exhaust gas including NOx and incomplete combustion product contaminants 84e. Various commercially available sensors such as thermocouples, and pressure transducers are available for detecting these performance parameters. Concentrations of air and exhaust components can be measured by instrumental analysis means such as on line gas chromatography or fourier transform infrared spectroscopy, for example.

The central processor unit can be programmed to compare the engine performance parameters against preselected goal values. Based on prior experimentation, a mathematical model of predicted engine performance in response to the quality of enriched air feed to the engine can be obtained. The central processor unit can be preprogrammed with software which calculates the predicted engine feed air enrichment that should produce the desired goal performance parameter. Additionally, according to a preprogrammed algorithm, the processor calculates output signals which direct the adjustment of throttling means to produce the predicted engine feed air enrichment.

For example, a performance parameter goal of 1,000 ppm NOx in tail pipe emissions is desired. Sensing means detect that the actual exhaust tail pipe emissions at a particular time contain 1,500 ppm NOx. A predictive model based on prior engine air feed versus emissions performance indicates that 82 vol. % nitrogen in engine air feed should produce the goal emissions concentration. Sensing means further tell the processor that the then current enriched nitrogen feed concentration is 80 vol. %. A control algorithm calculates output control signals to the throttling means appropriate to achieve the desired increased nitrogen enrichment. The throttling means are adjusted which causes the enrichment of the engine feed air to change. The control system process can be repeated cyclically to continuously maintain the engine performance parameter at the goal value.

A preferred method of changing the extent of nitrogen or oxygen enrichment of the enriched air produced by the gas permeable membrane unit involves changing the stage cut. When a nitrogen enriched air stream is being fed to an engine and a higher concentration of nitrogen, i.e., greater enrichment, is sought as in the preceding example, the stage cut is increased so that more oxygen permeates the membrane. This leaves the retentate more depleted of oxygen, and therefore, more nitrogen enriched as desired. Similarly, if oxygen enriched air is being fed and greater oxygen enrichment is desired, the stage cut should be decreased. The stage cut should be decreased to obtain less enrichment of nitrogen enriched air or increased to get less enrichment of oxygen enriched air.

The preferred method of control can be further explained with reference to FIG. 4. Assuming that the system is set for feeding nitrogen enriched air to engine 21, valves 11 and 19 are set to vent oxygen enriched air through line 47 and to feed nitrogen enriched air through line 41. Further assume that the apparatus is configured for pressure mode operation employing compressor 5. Hence, the permeate stream is carried through line 44 and flow control valve 14. To obtain greater nitrogen enrichment the stage cut should be increased by restricting flow through retentate control valve 7 while more widely opening permeate control valve 14. These actions promote the selective permeation of oxygen into the permeate stream and thereby creates a more oxygen depleted retentate stream.

One of ordinary skill in the art can now appreciate that the apparatus illustrated in FIG. 4 can easily be converted between feeding the nitrogen enriched retentate fraction and feeding the oxygen enriched permeate fraction quite simply by manipulating valves 11 and 19. Consequently, the novel apparatus can be used to obtain optimum engine performance that requires either oxygen enriched or nitrogen enriched air depending on criteria programmed into the central processor unit. For example, if engine is to be started from a cold condition, it is desirable to minimize cold start emissions by feeding oxygen enriched air. The central processor unit detects low engine temperature (e.g., from sensing means 84e). The programmed algorithm instructs the processor to switch three way vent valve 11 to vent the retentate fraction and to switch three way feed valve 19 to feed the permeate fraction. The program further sends signals to flow control valves 7, and 14 or 15, to produce a stage cut for optimum cold start emissions. When the engine achieves steady state running temperature condition, as detected by sensing means, it may then become desirable to reduce NOx emissions. The processor can instruct the apparatus to switch valves 11 and 19 to feed forward the retentate fraction while venting the permeate fraction. Thereafter, the processor will send output to the flow control valves to achieve optimum stage cut for NOx emission reduction in accordance with the programmed algorithm. Many criteria for switching between permeate and retentate feed modes can be programmed into the processor algorithm.

This invention is now illustrated by examples of certain representative embodiments thereof, wherein all parts, proportions and percentages are by weight unless otherwise indicated.

EXAMPLES

The nonporous membranes of the examples were of the following copolymers:

Polymer A copolymer of 85 mole % perfluoro-2,2-dimethyl-1,3-dioxole and 15 mole % tetrafluoroethylene Polymer B copolymer of 65 mole % perfluoro-2,2-dimethyl-1,3-dioxole and 35 mole % tetrafluoroethylene Example 1 and Comparative Example 1

Figure 7:
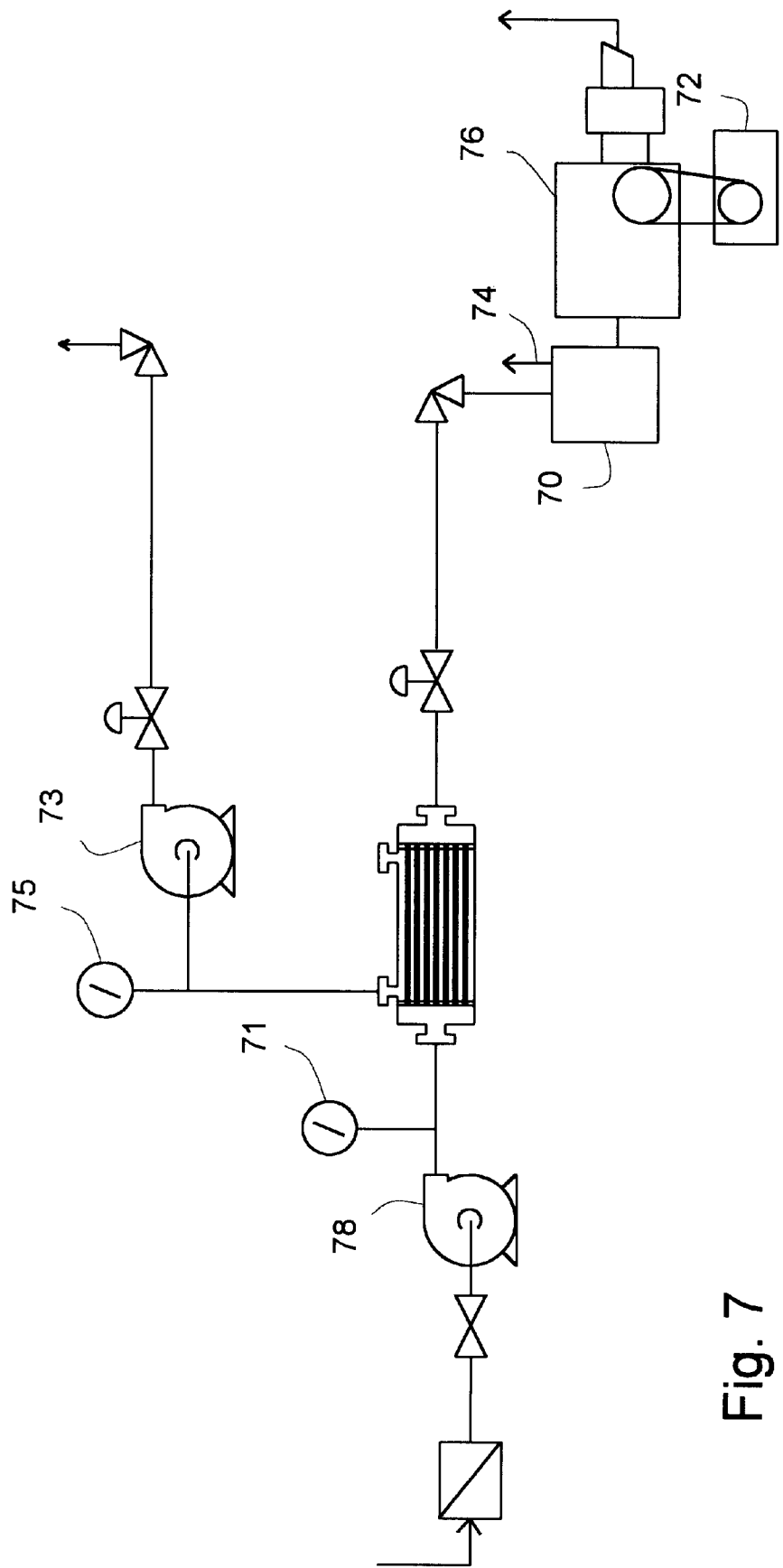
FIG. 7 is a schematic diagram of an apparatus using a hollow fiber gas permeable membrane unit in vacuum mode to supply nitrogen enriched air to a diesel engine.

A Farymann, single cylinder water cooled, naturally aspirated 4 hp diesel engine driving a 3 kW electric generator was tested for reduction of exhaust NOx and carbon monoxide emissions with feed of nitrogen enriched air. A test apparatus was rigged as shown schematically in FIG. 7. to operate in vacuum mode. Atmospheric air in the range of 10–21 ft$^3$/min. at 1 psig pressure (on gage 71) was blown into the tube side, retentate cavity of a membrane module 79 by blower 78 driven by a 120 volt electric motor. The cylindrical membrane module had nominal 3 inch diameter and contained about 6200 porous polysulfone hollow fibers of 7.5 inch length and 500 μm inner diameter which provided an effective gas transfer surface are of 18 ft$^2$. The inside surface of the tubes was coated with a nonporous layer of Polymer A to an effective thickness of less than 0.2 μm.

Flow control valves were throttled to achieve the desired stage cut that provided goal nitrogen enrichment of 81 vol. % as determined by a Hewlett Packard gas chromatograph. The permeate stream in the shell side permeate cavity was drawn at a pressure 75 in the range of 15–20 inch Hg gage by a vacuum pump 73 and the oxygen enriched permeate was vented to atmosphere. Nitrogen enriched retentate at a rate in the range of 7.5–8.5 ft$^3$/min. and 0.5 psig was fed into a 10 gal. chamber 70 with a 0.25 inch diameter vent 74 to atmosphere, thereby offsetting any slight turbocharging effect that the blower might cause. The nitrogen enriched air from the chamber fed the intake of diesel engine 76 driving generator 72. The generator was connected to a load bank (not shown) that could be varied to control the power load on the engine. Emissions data were analyzed over a two minute period using a Bacharach Model 300 NSX analyzer. The reported emission value was the average of the two minute analysis.

In Ex. 1, the engine was run with no load until the exhaust temperature and engine cooling water outlet temperature had stabilized. Engine performance parameters were recorded and are summarized in Table I. A load of 35% of total generator power was placed on the generator and after the engine stabilized data were taken again while maintaining enriched air intake at 81% nitrogen concentration. The load was changed and data were taken at 70% and 100% loads. In comparison (Comp. Ex. 1) the engine was supplied with ambient, atmospheric air and the 0, 35, 70 and 100% load tests were repeated. Data in Table I shows that NOx emissions reduced significantly at all load levels for 81% nitrogen enriched air feed compared to atmospheric air feed. These data show further that the reduction of NOx by feeding 81% nitrogen enriched air had very little effect on CO emissions at all load levels.

TABLE I

| | Ex. 1 | | Comp. Ex. 1 | |
|---|---|---|---|---|
| Load % | NOx (ppm) | CO (ppm) | NOx (ppm) | CO (ppm) |
| 0 | 65 | 379 | 263 | 400 |
| 35 | 71 | 293 | 337 | 408 |
| 70 | 70 | 951 | 243 | 1,087 |
| 100 | 91 | 3,416 | 135 | 3,373 |

Example 2

The procedure of Ex. 1 was repeated with the exception that two cylindrical membrane modules coated on the inside with Polymer B were installed in parallel. The membrane module construction was otherwise identical to that of Ex. 1 and accordingly the effective total gas transfer area was 36 ft$^2$. The vacuum pump pulled 13 inches Hg gage pressure to draw about 8 ft$^3$/min. permeate of the total 20.5 ft$^3$/min. feed air flow. This produced nitrogen enriched retentate of 83 vol. % nitrogen. Data from these tests are shown in Table II.

This experiment shows that increased nitrogen enrichment to the extent of 83 vol. % reduced NOx emissions slightly relative to 81 vol. %, but that the carbon monoxide emissions were dramatically increased in comparison to Comp. Ex. 1.

TABLE II

| | Ex. 2 | |
|---|---|---|
| Load % | NOx (ppm) | CO (ppm) |
| 0 | 31 | 661 |
| 35 | 83 | 1,481 |
| 70 | 67 | 2,741 |
| 100 | 85 | 3,750 |

Examples 3–5

Cylindrical hollow fiber membrane modules of the same construction as those in Ex. 2 were tested in pressure mode by feeding about 20 standard ft$^3$/min. ambient air pressurized to 100 psia through the tube side. A Servomex Model 750 A oxygen analyzer was used to determine the oxygen concentration in the feed, permeate and retentate streams. Data are presented in Table III

TABLE III

| | Ex. 3 | Ex. 4 | Ex. 5 |
|---|---|---|---|
| Feed air flow, std. ft$^3$/min. | 13.3 | 13.6 | 17.5 |
| Feed air pressure, psig | 20 | 20 | 19.9 |
| Retentate flow, std. ft$^3$/min. | 11.2 | 11.5 | 14.9 |
| Retentate pressure, psig | 19.9 | 19.9 | 19.7 |
| Retentate pressure drop, psi | 0.1 | 0.1 | 0.2 |
| Retentate nitrogen vol.% | 80.6 | 80.6 | 80.6 |
| Permeate flow, std. ft$^3$/min. | 2.1 | 2.1 | 2.7 |
| Permeate oxygen vol.% | 28.7 | 29.0 | 29.6 |

Examples 6–8

Cylindrical hollow fiber membrane modules of the same construction as those in Ex. 1 were tested as in Examples 3–5 except that vacuum mode used to draw vacuum on the shell side. Data are presented in Table IV.

TABLE IV

|  | Ex. 6 | Ex. 7 | Ex. 8 |
|---|---|---|---|
| Feed air flow, std. ft$^3$/min. | 23.1 | 27.1 | 30.3 |
| Feed air pressure, psig | 1.7 | 1.35 | 1.25 |
| Retentate flow, std. ft$^3$/min. | 5.4 | 17.7 | 15 |
| Retentate pressure drop, psi | 0.2 | 1.2 | 1.2 |
| Retentate nitrogen vol.% | 83.4 | 81.9 | 82.1 |
| Permeate flow, std. ft$^3$/min. | 17.7 | 9.4 | 15.3 |
| Permeate vacuum, inch Hg gage | 1.5 | 26.4 | 19.6 |
| Permeate oxygen vol.% | 22.3 | 26.6 | 24.1 |

Examples 9–10 and Comparative Example 2

Figure 8:
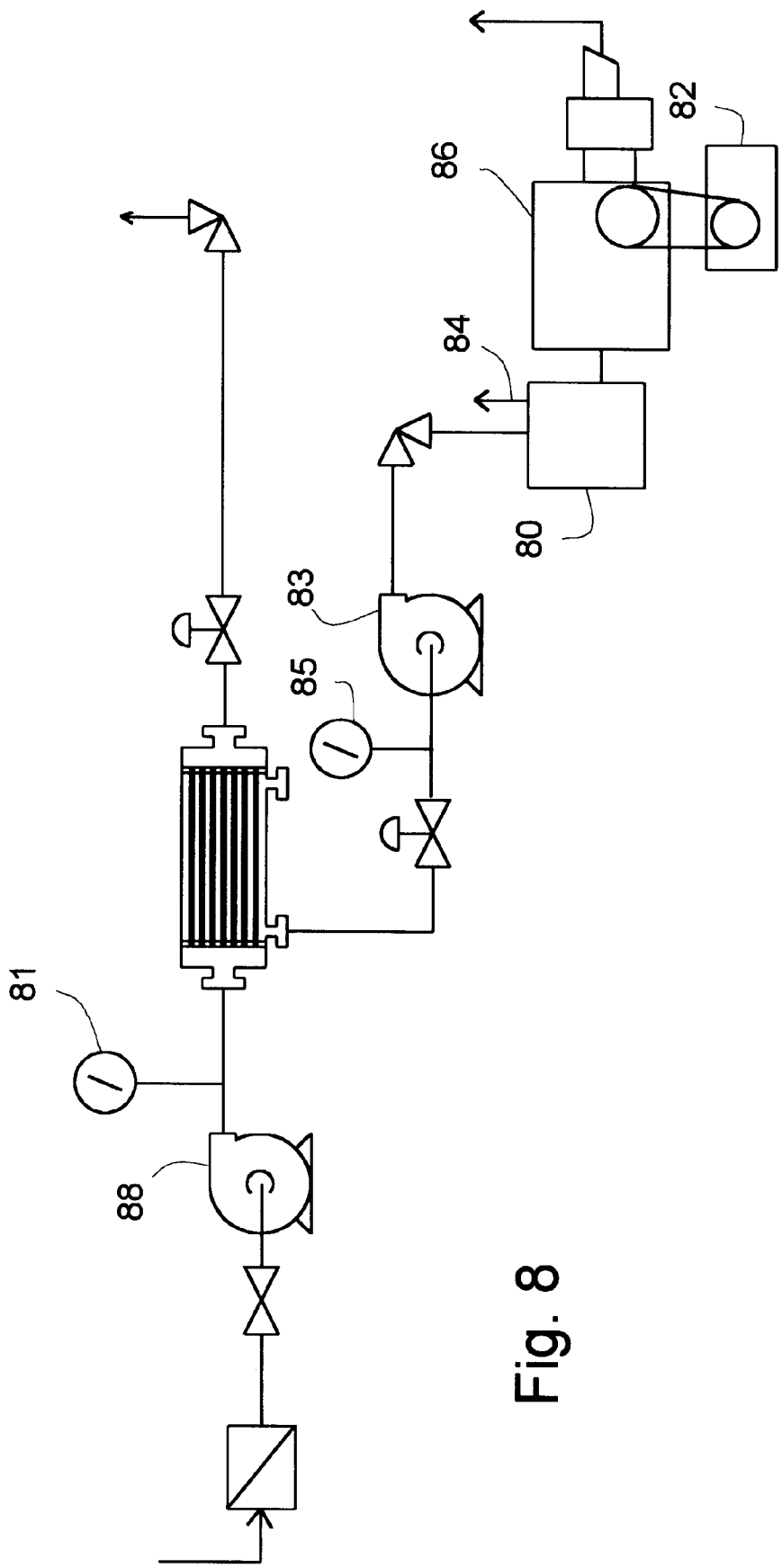
FIG. 8 is a schematic diagram of an apparatus using a hollow fiber gas permeable membrane unit in vacuum mode to supply oxygen enriched air to a diesel engine.

The diesel engine, generator and hollow fiber membrane module of Ex. 1 were rigged in vacuum mode for permeate feed as shown in FIG. 8. Low pressure blower 88 was used to flow air into the module. In Ex. 9, flow conditions were set for a stage cut to achieve 24 vol. % oxygen feed to the engine. At no load power draw by the generator the opacity of the engine exhaust gas was measured with a Wager 6500 Portable smoke meter. Generator output was increased in stages and the fuel injection was increased accordingly. Fuel in excess of that which combusted with available oxygen was exhausted as smoke indicated by increased exhaust opacity. In Ex. 10, the enriched feed to the engine contained 25.5 vol. % oxygen. The procedure was repeated in Comp. Ex. 2 with ambient (i.e., nominal 21 vol. % oxygen) air. Data are shown in Table IV.

The results show that additional fuel gave only minor power increases because a substantial portion does not combust with oxygen. Oxygen enriched air feed afforded by membrane separation gave much lower opacity at equivalent power drain compared to ambient air feed. This demonstrates that a higher power output from a given diesel engine can be obtained by enriched oxygen air feed.

TABLE IV

| Generator Output, kW | Comp. Ex. 2 | Ex. 9 | Ex. 10 |
|---|---|---|---|
| 0 | 2.6 | 1.6 | 0.9 |
| 1.0 | 3.5 | 2.1 | 1.7 |
| 1.9 | 11.9 | 6.6 | 5.4 |
| 2.3 | 46.5 | 16.2 | 10.8 |
| 2.8 | 96.5 | 30.9 | 23.3 |

Examples 11 and Comparative Example 3

An Onan 3 kW electric generator gasoline engine was equipped with electronic fuel injection controls. This allowed the fuel flow to be held constant while engine output speed was adjusted exclusively by throttling air supply flow. In Example 11, air supplied to the engine was oxygen enriched by separation with a cylindrical hollow fiber module membrane unit of the same construction as in Ex. 1.

The membrane was set up to operate in vacuum mode with the configuration substantially as shown in FIG. 8 so as to provide 23 vol. % oxygen enriched air. The engine was controlled to draw 0.4 horsepower at 2200 rev./min. Air to fuel ratio was increased in stages. Fuel consumption and exhaust data are shown in Table V. In Comp. Ex. 3, the procedure was repeated with ambient (i.e., 21 vol. % oxygen) air.

TABLE V

|  | Ex. 11 | | | | Comp. Ex. 3 | | | |
|---|---|---|---|---|---|---|---|---|
| Air to Fuel Ratio | Fuel Consumption (gal/hr) | Exhaust air Oxygen (vol.%) | Exhaust air NOx (ppm) | Exhaust air Hydrocarbon (ppm) | Fuel Consumption (gal/hr) | Exhaust air Oxygen (vol.%) | Exhaust air NOx (ppm) | Exhaust air Hydrocarbon (ppm) |
| 14.7:1 | 0.169 | 1.09 | 1,862 | 333 | 0.165 | 1.04 | 742.5 | 364.5 |
| 16.1:1 | 0.158 | 2.69 | 1,760 | 255 | 0.170 | 2.46 | 690 | 276.5 |
| 18.0:1 | 0.158 | 5.05 | 938 | 214 | 0.155 | 4.6 | 282 | 250 |
| 20.1:1 | 0.170 | 7.15 | 277 | 230 | — | — | — | — |

The engine could not run at an air to fuel ratio above 18 with ambient air. These data show that the lean-burn limit for the gasoline engine was extended to an air to fuel ratio of 20.1:1 by feeding oxygen enriched air produced by the membrane separation process.

Example 12

The same apparatus used in Example 11 was employed to determine the lean-burn air to fuel ratio limit resulting from partly oxygen depleted air. The apparatus was configured as in FIG. 7 to achieve vacuum mode, retentate air feed to the engine. Stage cut was adjusted to obtain 19 vol. % oxygen in engine feed air. The procedures followed in Example 11 were repeated with results shown in Table VI.

It was found that the engine lean-burn limit could not be extended beyond the 16:1 air to fuel ratio with the oxygen depleted air being fed. It is understood from this example that one would not normally attempt to extend the lean-burn limit by feeding nitrogen enriched air. However, this experiment taken in combination with Examples 11 and Comp. Ex. 3 demonstrates that the flexibility of the gas permeable membrane separation technique for supplying either nitrogen or oxygen enriched air to an internal combustion engine to affect engine performance.

TABLE VI

|  | Comp. Ex. 3 | | | |
|---|---|---|---|---|
| Air to Fuel Ratio | Fuel Consumption (gal/hr) | Exhaust air Oxygen (vol.%) | Exhaust air NOx (ppm) | Exhaust air Hydrocarbon (ppm) |
| 14.7:1 | 0.164 | 0.98 | 218 | 341 |
| 16.0:1 | 0.158 | 2.14 | 185 | 265 |

Example 13

Figure 9:
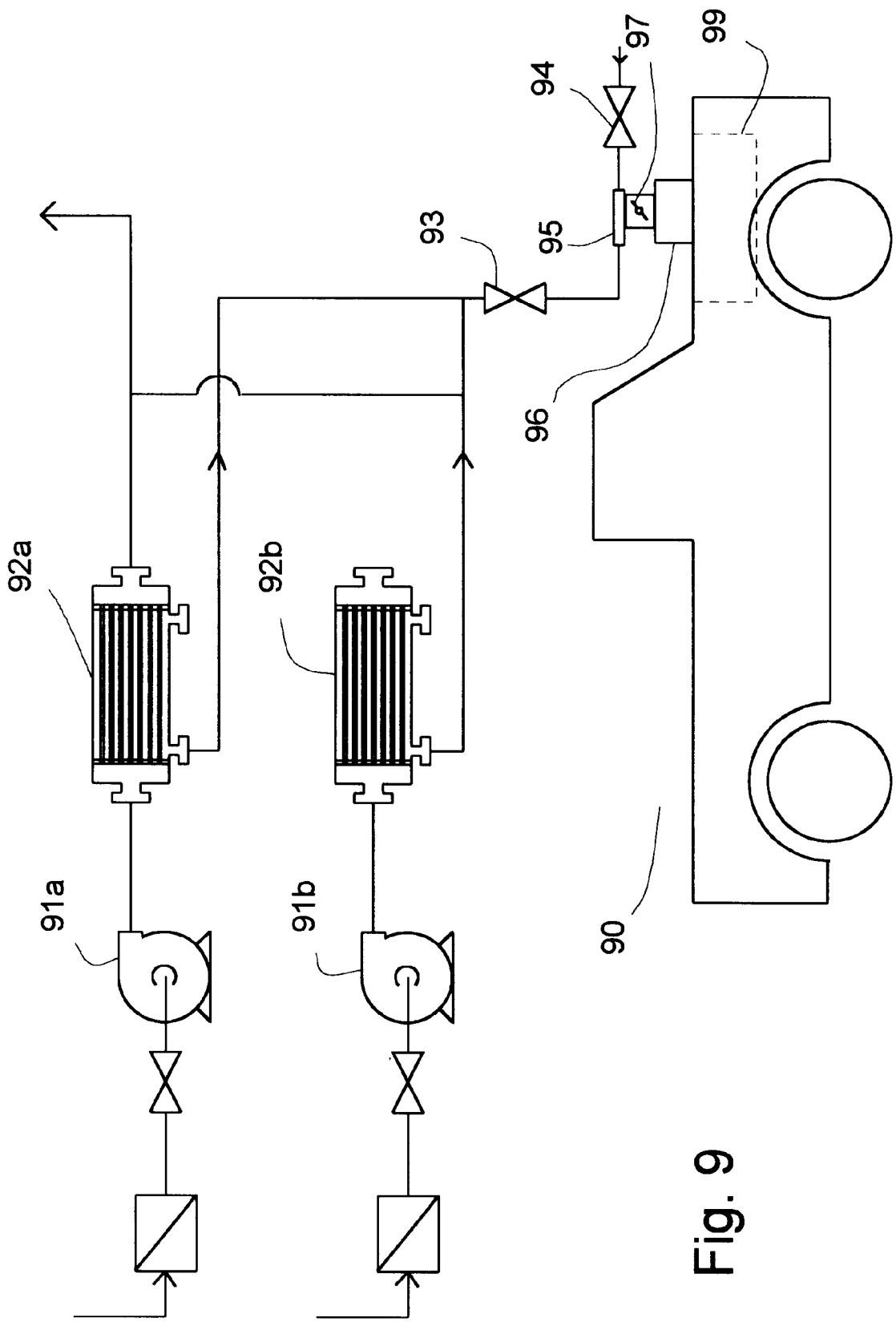
FIG. 9 is a schematic diagram of a gas permeable membrane apparatus installed on an automobile with a gasoline powered engine.

The throttle body 96 having a throttle plate 97 of a 2.5 liter, fuel injected gasoline engine 99 in a 1988 Chevrolet S-10 pick-up truck 90 was equipped with an air-tight cover 95 fabricated from 4 inch diameter polyvinyl chloride pipe, as shown schematically on FIG. 9. A 1.5 inch ambient air feed line with a block valve 94 was installed in the front of the cover. The permeate streams of two identical cylindrical hollow fiber gas permeable membrane module units 92a, 92b were connected in parallel to a block valve 93 which lead to the cover 95. The membrane modules were 3 inches in overall diameter and each had about 3,000 microporous polysulfone hollow fibers of 750 μm inner diameter and effective length of 7.5 inches. The inside of the tubes was coated with a nonporous layer of <0.2 μm thickness of Polymer A. The total effective gas transfer area of both modules was 29 ft². The membrane modules were mounted on the truck and 12 V direct current blowers 91a and 91b were installed to blow ambient air into the module tube sides, as shown. Prior to installation in the truck, the modules were each individually bench tested to provide 13 standard ft³/min. of 25 vol. % oxygen enriched permeate under pull of 17 inch Hg. gage vacuum.

The engine was started with the truck at stand still with valve 93 closed and valve 94 open. Engine rev./min. and vacuum at engine cover 95 were measured and air flow calculated therefrom. Data are reported in Table VII. Positions of valves 93 and 94 were reversed and air flow through the membrane modules was similarly calculated while oxygen concentration of the enriched permeate stream was measured. Fuel rate was increased to speed the engine revolutions to maximum of 3200 rev./min. and measurements were repeated.

With valves again set for ambient air feed only, the truck was driven on the road at 35 miles per hour. The valves were again reversed allowing oxygen enriched air to supply the engine. Data are also shown in Table VII.

This Example demonstrates that the membrane modules could supply sufficient oxygen enriched air to drive an automobile with only engine vacuum pulling permeate through the modules. The same vehicle performance, i.e., engine speed and vehicle speed, as obtained with ambient air feed was obtained with module-supplied air. However, the module-supplied air contained 24 vol. % oxygen. In another embodiment, it has been demonstrated that the oxygen enriched air can be fed to the throttle body 96 downstream of the throttle plate 97.

TABLE VII

| Condition | Engine Speed (rev./min.) | Vehicle Speed (miles/hour) | Cover Pressure (inch Hg gage) | Air Flow (Std. ft³/min.) | Oxygen Concentration (vol. %) |
|---|---|---|---|---|---|
| Ambient Air | 900 | 0 | 22 | 6 | 21 |
| Module Air | 900 | 0 | 17 | 5 | 24 |
| Module air | 3,200 | 0 | 16 | 20 | 24 |
| Ambient air | 2,500 | 35 | 17 | 15 | 21 |
| Module Air | 2,500 | 35 | 15 | 15 | 24 |

What is claimed is:

1. A method of operating an engine energized by internal combustion of a mixture of fuel and combustion air that comprises the steps of:

(A) separating air into an oxygen enriched fraction and nitrogen enriched fraction with a selectively gas permeable membrane unit; and (B) feeding enriched air selected from the group consisting of the oxygen enriched fraction and the nitrogen enriched fraction to the engine, wherein said mixture is free of ambient atmospheric air, and;

wherein the selectively gas permeable membrane unit includes a nonporous membrane (i) having an oxygen/nitrogen selectivity of at least 1.4 and a permeability to oxygen of at least 50 barrers;

(ii) formed from an amorphous copolymer of perfluoro-2,2-dimethyl-1,3-dioxole; and (iii) being at a temperature below the glass transition temperature of the amorphous copolymer.

2. The method of claim 1 wherein the amorphous copolymer is a copolymer of perfluoro-2,2-dimethyl-1,3-dioxole and a complementary amount of at least one monomer selected from the group consisting of tetrafluoroethylene, perfluoromethyl vinyl ether, vinylidene fluoride, hexafluoropropylene and chlorotrifluoroethylene.

3. The method of claim 2 wherein the amorphous copolymer is a dipolymer of perfluoro-2,2-dimethyl-1,3-dioxole and tetrafluoroethylene.

4. The method of claim 1 wherein the nonporous membrane is supported by a microporous substrate of a polymer selected from the group consisting of polyolefin; fluorinated polyolefin; polysulfone; cellulose ester polymer; a copolymer of olefin, a copolymer of fluorinated olefin; a polysulfone copolymer; a cellulose ester copolymer and a mixture of at least two of them.

5. The method of claim 4 wherein the microporous substrate is a hollow fiber.

6. The method of claim 1 wherein the selectively gas permeable membrane unit includes (1) an elongated casing having two ends;

(2) a first tube sheet at one end of the casing having a first tube sheet outboard face;

(3) a second tube sheet at the other end of the casing having a second tube sheet outboard face;

(4) a plurality of open ended, microporous hollow fibers extending in substantially parallel alignment within the casing from the first tube sheet outboard face to the second tube sheet outboard face, the hollow fibers collectively having an inside surface and an outside surface, the inside surface defining a tube side cavity; and the casing and the outside surface defining a shell side cavity; and (5) at least one shell side port through the casing;

wherein at least one of the inside surface and the outside surface is coated with the nonporous membrane.

7. The method of claim 6 wherein the separating step further comprises the steps of:

(I) introducing the air into one end of the tube side cavity;

(II) withdrawing the nitrogen enriched fraction from the second end of the tube side cavity; and (III) withdrawing the oxygen enriched fraction from the shell side cavity.

8. The method of claim 6 wherein the separating step further comprises the steps of:

(I) introducing the air into one shell side port;

(II) withdrawing the nitrogen enriched fraction from another shell side port distant from the one shell side port; and (III) withdrawing the oxygen enriched fraction from at least one end of the tube side cavity.

9. The method of claim 6 wherein the separating step includes transferring oxygen through the membrane at a flux of at least about 400 GPU.

10. The method of claim 1 wherein the engine is a compression ignition engine.

11. The method of claim 10 wherein the engine is a diesel engine.

12. The method of claim 1 wherein the engine is a spark ignition engine.

13. The method of claim 1 wherein the oxygen enriched fraction comprises about 22 to about 40 vol. % oxygen.

14. The method of claim 1 wherein the nitrogen enriched fraction comprises about 80 to about 95 vol. % nitrogen.

15. The method of claim 1 in which the enriched air consists of the oxygen enriched fraction.

16. The method of claim 1 in which the enriched air consists of the nitrogen enriched fraction.

17. The method of claim 1 in which only one of the oxygen enriched air and the nitrogen enriched air is fed to the engine at any time.

18. An apparatus to feed enriched air to an engine energized by internal combustion of a mixture of fuel and combustion air, the apparatus comprising:
   (a) a selectively gas permeable membrane unit including
      a casing; and
      a nonporous membrane within the casing, wherein the membrane (i) has an oxygen/nitrogen selectivity of at least 1.4, and a permeability to oxygen of at least 50 barrers; (ii) is formed from an amorphous copolymer of perfluoro-2,2-dimethyl-1,3-dioxole; and iii) is at a temperature below the glass transition temperature of the amorphous copolymer;
      a retentate cavity within the casing on one side of the membrane, the retentate cavity being a source of a retentate stream flow of nitrogen enriched air produced by selective permeation through the membrane of oxygen from a feed stream flow of ambient air into the retentate cavity; and
      a permeate cavity within the casing on the opposite side of the membrane, the permeate cavity being a source of a permeate stream flow of oxygen enriched air; wherein the ratio of the permeate stream flow to the feed stream flow defines a stage cut; and
   (b) pressure modification means for creating a negative pressure gradient across the membrane from a retentate cavity pressure to a permeate cavity pressure; and
   (c) a feed selection valve adapted to direct either said oxygen enriched air or said nitrogen enriched air to the engine,
the apparatus being operative to provide said mixture free of ambient atmospheric air.

19. The apparatus of claim 18 wherein the pressure modification means comprises compression means for raising the retentate cavity pressure above the permeate cavity pressure.

20. The apparatus of claim 18 wherein the pressure modification means comprises suction means for lowering the permeate cavity pressure below the retentate cavity pressure.

21. The apparatus of claim 18 further comprising a vent selection valve adapted to vent either oxygen enriched air or nitrogen enriched air.

22. The apparatus of claim 21 further comprising feedback control means for controlling the stage cut in response to engine performance parameters selected from among, (i) concentration of nitrogen oxides in engine exhaust, (ii) engine power, (iii) engine lean burn limit, and (iv) cold start up emissions.

23. The apparatus of claim 22 wherein the feedback control means comprises:
   (A) throttling means for independently adjusting the permeate stream flow rate and the retentate stream flow rate;
   (B) sensing means for detecting and converting apparatus operating characteristics at selected locations in the apparatus and engine performance parameters to machine readable signals; and
   (C) programmable control means for receiving the machine readable signals, evaluating the signals according to a preselected programmed algorithm, and dispatching control signals to the throttling means.

24. The apparatus of claim 23 wherein the feed selection valve is set to feed the retentate stream flow to the engine and the vent selection valve is set to vent the permeate stream flow.

25. The apparatus of claim 23 wherein the feed selection valve is set to feed the permeate stream flow to the combustion chamber and the vent selection valve is set to vent the retentate stream flow.

26. The apparatus of claim 18 wherein the selectively gas permeable membrane unit includes
   (1) an elongated casing having two ends;
   (2) a first tube sheet at one end of the casing having a first tube sheet outboard face;
   (3) a second tube sheet at the other end of the casing having a second tube sheet outboard face;
   (4) a plurality of open ended, microporous hollow fibers extending in substantially parallel alignment within the casing from the first tube sheet outboard face to the second tube sheet outboard face, the hollow fibers collectively having an inside surface and an outside surface, the inside surface defining a tube side cavity; and the casing and the outside surface defining a shell side cavity; and
   (5) at least one shell side port through the casing;
wherein at least one of the inside surface and the outside surface is coated with the nonporous membrane.

27. The apparatus of claim 26 having an transferring oxygen flux through the membrane unit of at least about 400 GPU.

28. The apparatus of claim 18 wherein the pressure modification means consists of the normal engine operating vacuum.

29. The apparatus of claim 28 wherein the engine has a throttle body with a throttle plate and the enriched air is fed to the throttle body downstream of the throttle plate.

* * * * *

UNITED STATES PATENT AND TRADEMARK OFFICE
CERTIFICATE OF CORRECTION

PATENT NO. : 5,960,777
DATED : October 5, 1999
INVENTOR(S) : Stuart Nemser et al.

Page 1 of 1

It is certified that error appears in the above-identified patent and that said Letters Patent is hereby corrected as shown below:

Column 1,
Before "FIELD OF THE INVENTION" insert the following paragraph:

-- This invention was made with Government support under contract number 68-D6-0042 awarded by the Environmental Protection Agency. The Government has certain rights in the invention. --

Signed and Sealed this

Eighteenth Day of December, 2001

Attest:

Attesting Officer

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 5,960,777 | Page 1 of 1 |
| APPLICATION NO. | : 09/027035 | |
| DATED | : October 5, 1999 | |
| INVENTOR(S) | : Stuart Nemser et al. | |

It is certified that error appears in the above-identified patent and that said Letters Patent is hereby corrected as shown below:

In the Specification

Column 1, line 3,
Before "FIELD OF THE INVENTION" insert the following paragraph:

--Support was provided under Environmental Protection Agency award 68D60055. The U.S. government has rights in this patent application. --

This certificate supersedes the Certificate of Correction issued December 18, 2001.

Signed and Sealed this
First Day of September, 2015

Michelle K. Lee
*Director of the United States Patent and Trademark Office*